Feb. 22, 1966 R. T. GELDER 3,236,095
LIQUID INSPECTION SYSTEM AND APPARATUS
Filed May 22, 1962 3 Sheets-Sheet 1

INVENTOR.
ROBERT T. GELDER DECEASED
BY MARY W. GELDER ADMINISTRATRIX
BY David L. Royer
AGENT

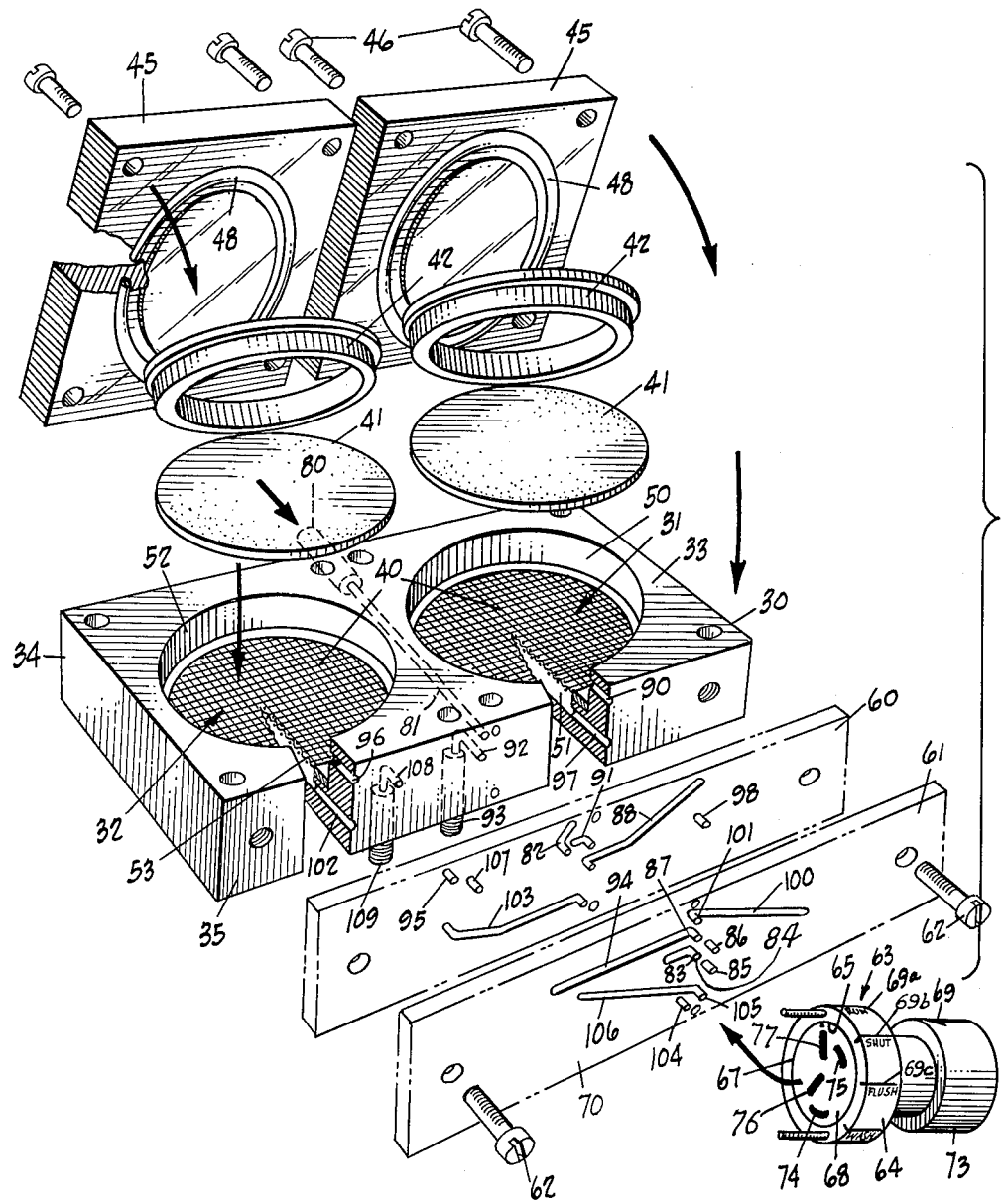

Feb. 22, 1966 R. T. GELDER 3,236,095
LIQUID INSPECTION SYSTEM AND APPARATUS
Filed May 22, 1962 3 Sheets-Sheet 3
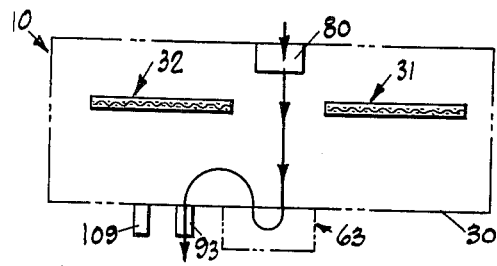
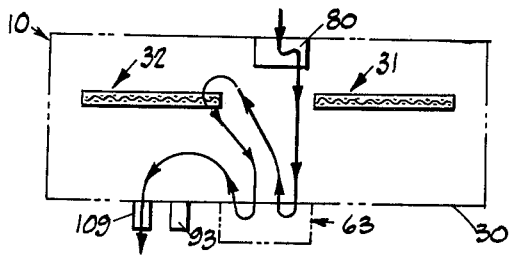
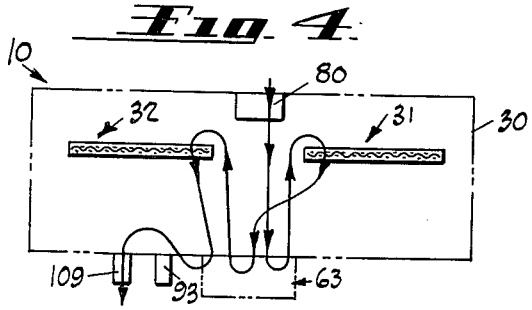
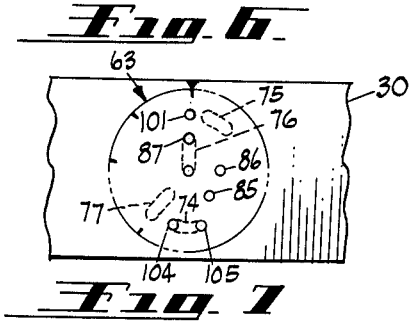
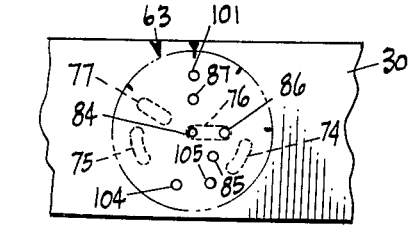
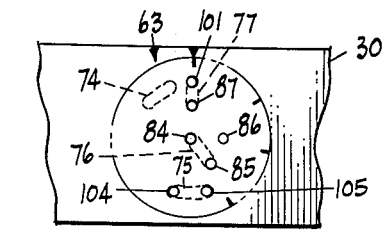
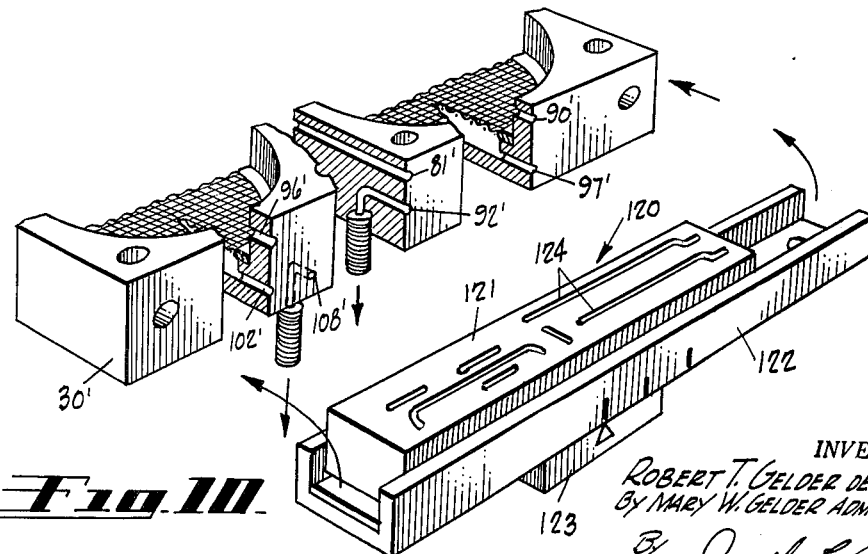
INVENTOR.
ROBERT T. GELDER DECEASED
BY MARY W. GELDER ADMINISTRATRIX
BY
AGENT United States Patent Office 3,236,095
Patented Feb. 22, 1966

3,236,095
LIQUID INSPECTION SYSTEM AND APPARATUS
Robert T. Gelder, deceased, late of Palos Verdes Estates, Calif., by Mary W. Gelder, administratrix, Palos Verdes Estates, Calif., assignor to Douglas Aircraft Company, Inc., Santa Monica, Calif.
Filed May 22, 1962, Ser. No. 197,198
8 Claims. (Cl. 73—61)

The present invention relates generally to liquid inspection systems and apparatus for determining the presence of contaminants in liquids.

The great variety of systems used to conduct liquids from one place to another rely, to a great extent, for efficient, reliable and continued operation thereof on the maintenance of contamination-free conditions. For example, in systems employed in aircraft, missiles, machine tool controls, processing controls and the like, hydraulic fluids are utilized and conducted through conduit for operation of various utilization devices such as valves, hydraulic actuators, positioners and the like. Additionally, in many of these systems, devices upon which the fluid must act and through which the fluid must pass are frequently of a precision nature. In the case of hydraulic actuators, for example, moving elements such as pistons and seals are affected in their operation by contaminants in the hydraulic fluid. Control devices such as orifices may also be of a relatively small finite size and any deviation from such size affecting operation of the control. Particles of foreign material comprising the contaminants in such hydraulic fluid or other liquids cause premature wear of relatively moving components and serve to erode, occlude or otherwise change the area of these orifices.

Similar problems also arise in other liquid systems such as those carrying fuel through aspiration devices or nozzles. In such instances, the presence of contaminants serves to alter flow characteristics of the fuel through the system, thus producing adverse operating characteristics of motive devices such as engines, rocket motors and the like that may be associated therewith.

Contaminants that are normally found in liquids used in the various liquid systems generally take the form of organic and inorganic particles that are originally introduced into the liquid prior to placement in the system, or which are contributed to the liquid by various elements, components and operating structures associated with the system. More specifically, these contaminants may take the form of metallic particles, dust, minute pieces of rubber or silicone material, hair and the like, or may be colonies of microorganisms. In most instances, liquids used in the described systems are carefully cleaned and filtered prior to injection in the system and any remaining contaminants may be in the order of .1 to 10 microns, or larger. Such small particles, while affecting operation of equipment associated with the systems, are extremely difficult to detect in the absence of relatively elaborate laboratory facilities. Additionally, it is desirable to enable detection of contaminants in certain liquid systems while the system is in operation and, in some cases, while a high pressure is applied to the liquid. Under these conditions, the contaminants are generally maintained in suspension.

Prior attempts at obtaining samples of liquid flowing in a system, for examination as to contaminant content, have included various types of valve arrangements for removing samples of the liquid, such samples being used for later examination as by microscopic analysis. While such systems are satisfactory in some instances, there is a substantial likelihood of introduction of contaminants into the sample that do not arise from or which were not originally contained in the liquid in the system. Obviously, valve structures may have contaminated discharge ports and containers, in which the sample is collected, may also contain contaminants. Still further, contaminants may be introduced to the liquid by exposure to ambient atmosphere or during the transportation of the sample from its point of collection to a point of examination. Accordingly, the subsequent examination may provide a false indication of contaminant content. Additionally, there is generally a considerable time lag between the taking of a sample of the liquid and the providing of a report on contaminant content, especially in instances where laboratory examination facilities are located at some distance from the system under examination.

It is therefore one important object of the present invention to provide a system and apparatus for determining the presence of contaminants in a liquid.

It is another important object of the invention to provide a contaminant determining system and apparatus for use in connection with liquid systems, while such systems are in operation, and at the site thereof.

A still further important object of the invention is to provide a system and apparatus for determining contaminant content in a liquid and wherein contaminants in the liquid may be readily determined by visual inspection of portions of the apparatus.

A further object of the invention is to provide a system and apparatus for determining contaminant content in liquids wherein a sample of a liquid may be obtained from an operating system and examined without likelihood of introduction of additional contaminants to the liquid under examination.

In accordance with one aspect of the invention, when it is desired to inspect the liquid flowing in a system, the apparatus hereof is connected into the system and, under control of suitable valving, a small measured quantity of liquid is permitted to flow therethrough and directly to a receptacle to rinse the apparatus and remove any liquid or contaminants in passages or chambers of the apparatus. Thereafter, the valving is changed to direct a flow of a desired quantity of the liquid over a first filter membrane and to the receptacle, depositing any contaminants on the membrane. The flow of liquid is then discontinued and a suitable solvent is admitted to the apparatus, passing first over a second filter membrane to remove any contaminants from the solvent and then over the first membrane and to the receptacle to remove substantially all residue of the liquid from the first membrane and clearly to expose any contaminants collected thereon. A portion of the apparatus overlying the membranes is transparent to permit visual examination of the membranes and any contaminants collected thereon.

In accordance with a further aspect of the invention, a single multiple-passage valve arrangement is provided and carried by the apparatus whereby to provide common control means for the desired sequential operation of the system and apparatus. Additionally, the relatively small and compact size of the apparatus enables use thereof at the site of the system under examination without unduly long connecting lines or elaborate transportation or supporting equipment. The apparatus may also be used for conducting repeated tests without time-consuming service or replacement of elements, means being provided to enable cleansing and drying of the chambers, passages and filter elements of the apparatus and system in which it is contained.

Other and further important features and aspects of the invention will become apparent from the disclosures in the following detail description, appended claims and acompanying drawings, wherein:

FIG. 3 is an exploded perspective view showing details of the apparatus of the present invention;

FIGS. 4 through 9, inclusive are diagrammatic views depicting various sequences of operation and liquid flow paths through the apparatus; and FIG. 10 is an exploded fragmentary perspective view illustrating a modified form of valve arrangement of the present apparatus.

Figure 1:
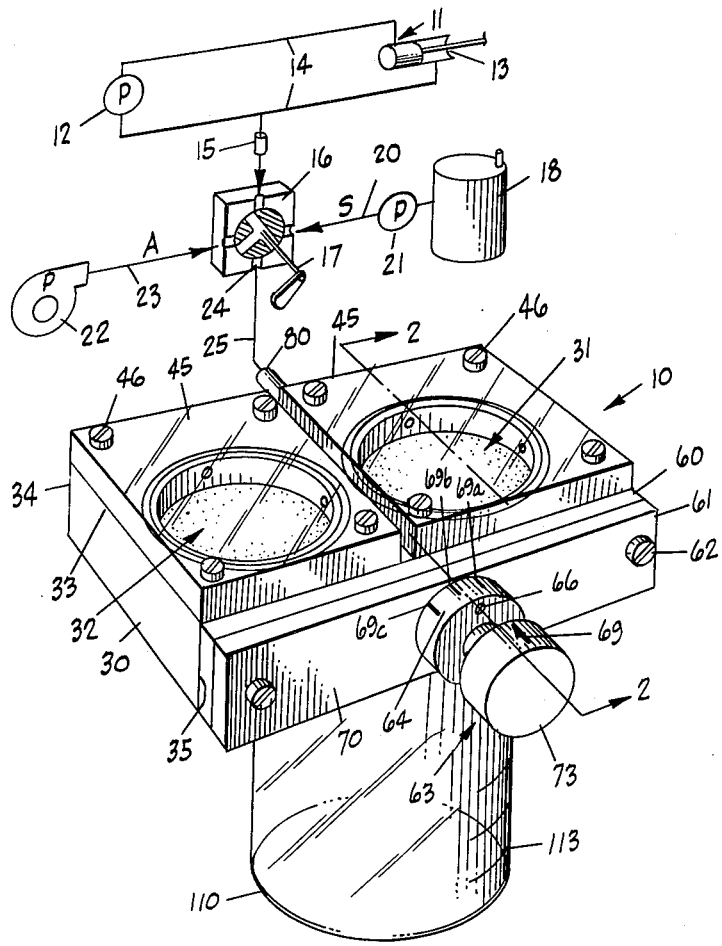
FIGURE 1 is a perspective view of the inspection system and apparatus of the present invention showing portions of the system in a diagrammatic form.

With reference to the drawings and with reference primarily to FIG 1, the liquid inspection apparatus is shown as indicated generally at 10. The apparatus 10 is adapted for connection to any suitable liquid carrying system and where there is a desire to examine the liquid for contaminant content. Such a system is indicated generally at 11 and shown as including a suitable liquid pump 12 and a utilization device such as a hydraulic actuator 13, that are interconnected by means of suitable conduits 14. The conduits 14 of the system 11 are coupled by means of a coupling device 15 to a suitable multiposition valve 16 having operating means 17. For purposes to be hereinafter more fully described, the valve 16 is also connected to a source of a liquid solvent, indicated at 18, through a conduit 20 in which a suitable pump 21 is positioned. Additionally, the valve 16 is connected to a source of compressed air, such as from a compressor 22 and by way of conduit 23. The valve 16 thus has a plurality of inlets and a common outlet, indicated at 24, that is connected to a suitable conduit 25. The valve 16 therefore serves selectively to couple liquid from the system 11, solvent from the source 18 or air from the compressor 22 to the conduit 25 which extends to the inspection apparatus 10.

Figure 2:
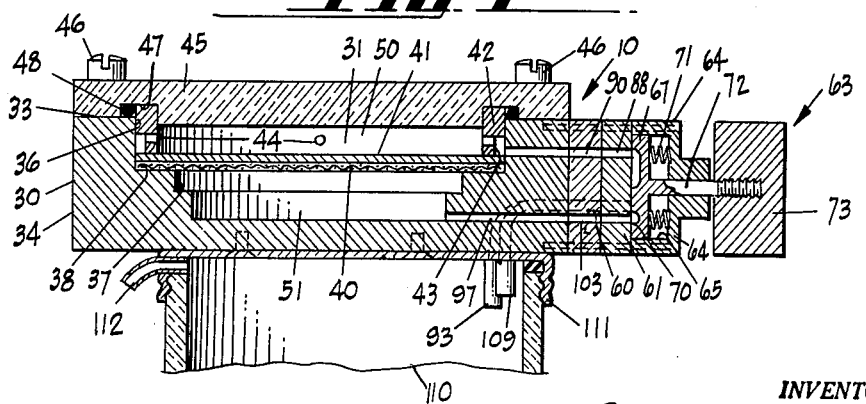
FIG. 2 is a transverse sectional view through the apparatus, taken substantially as indicated by line 2—2, FIG. 1.

With reference primarily to FIGS. 1, 2 and 3, the apparatus 10 includes a body or housing portion 30. The body 30 is illustrated as being a generally rectilinear block of solid material, such as aluminum or the like, in which a pair of recesses, indicated generally at 31 and 32, are formed. The recesses 31 and 32 are typically identical and are open at one surface 33 of the body 30. The body 30 is further provided with opposed faces 34 and 35. One of the recesses (in this instance, recess 31) is typically illustrated in FIG. 2 and includes an annular upper stepped portion 36 and lower reduced diameter stepped portion 37, there being an annular shoulder 38 defined therebetween. The shoulder 38 serves to support a screen 40 and a filter membrane 41, the screen and membrane being retained in position by means of a retaining ring 42. The retaining ring 42 has an outer peripheral groove 43 and a plurality of radially extended openings 44 therethrough. The ring 42 is adapted for reception in the annular upper portion 36 of the recess 31 and extends beyond the surface 33, of the body 30.

Each of the retaining rings 42 in the recesses 31 and 32, respectively, are maintained in position and serve to urge the membrane 41 and screen 40 in each of the recesses into tight contact with the shoulder 38 by means of a pair of substantially identical cover plates 45. The cover plates 45 are secured to the body 30 by means of a plurality of bolts 46 which threadably engage the body 30. The plates 45 may be made from any suitable transparent material, such as glass or a transparent plastic, and are each provided with an annular groove 47, the inner peripheral area of which serves to receive the portion of the retaining ring 42 extending beyond the surface 33 of the body 30. The outer peripheral area of the groove 47 serves to receive an annular sealing member 48 that is adapted for sealing contact with the surface 33 of the body 30. The plates 45 are thus sealed with respect to the body 30 and provide a transparent closure for the recesses 31 and 32. A pair of chambers is thus defined in each of the recesses 31 and 32 on each side of each of the screens 40 and the membranes 41, the membranes 41 providing a common wall between such chambers. As shown, the recess 31 is thus divided into chambers 50 and 51 and the recess 32 is divided into chambers 52 and 53.

With specific reference to the screens 40 and membranes 41, the screens 40 serve to support the membranes and may take the form of any suitable material such as stainless steel or the like having openings therein of a size in the order of 30 to 40 microns. The filter membranes 41 may be any suitable material having a suitable porosity commensurate with the size of contaminant particles that are desired for collection by the membrane. In actual practice, openings in the order of from .1 to 10 microns are sufficient. Particularly, a membrane suitable for the present purposes may be that manufactured by the Millipore Filter Corporation of Bedford, Massachusetts, and known as a Millipore filter. This particular filter is in the order of .010" to .020" in thickness, is white in color and is made from a fibrous material having a high void to solids ratio. Particularly, the voids may occupy 70 to 80 percent of the area of the filter while still retaining the .1 to 10 micron openings.

As shown in FIGS. 1, 2 and 3, first and second adapter plates 60 and 61, respectively, are positioned in face contact with each other for common attachment to the body 30, the plate 60 being positioned in contact with the face 35 of the body. The plates 60 and 61 are commonly attached to the body as by a pair of screws 62 which threadably engage the body 30. In this form of the invention, the plate 61 also serves to support a valve, indicated generally at 63, and including a body portion 64 having an annular recess 65 therein. The body portion 64 is adapted for attachment to the plate 61 by means of a pair of screws 66. The recess 65 slidably receives an annular valve member 67, a face 68 of which is adapted for contact with a face 70 of the plate 61, the face 68 of the valve member 67 being urged into contact with the face 70 of the plate 61 by means of a pair of compression springs 71 that are disposed between the valve body 64 and the valve member 67. The valve member 67 is further carried by a shaft 72 that is threadably secured to a valve operating knob 73, the knob 73 being provided with an indicating mark as at 69 that is cooperatively related to a plurality of indicating marks 69a, 69b and 69c positioned about the periphery of the valve body 64. For purposes to be hereinafter more fully described, a pair of semicircular grooves 74 and 75 and a pair of radially extending grooves 76 and 77 are provided in the face 68 of the valve member 67.

As shown primarily in FIG. 3, the body 30 and plates 60 and 61 are provided with a plurality of passages and ports for the purpose of conducting liquid to be examined, solvent and air through the desired paths within the apparatus. The conduit 25, extending from the valve 16, is adapted for connection to a suitable fitting 80 carried by the body 30 and protruding from the face 34 thereof. The fitting 80 communicates with a passage 81 which extends to the face 35 of the body 30 and communicates with one end of a passage 82 in the plate 60. The passage 82 further communicates with a passage 83 in the plate 61 which has a port 84 positioned at the center of a plurality of ports disposed in a general semicircular pattern thereabout. The port 84 is in constant communication with the groove 76 in the valve member 67. The groove 76 is selectively in communication with a plurality of ports 85, 86 or 87 carried by the plate 61. The port 85 communicates with a passage 88 in the plate 60 which, in turn, communicates with a passage 90 in the body 30 which opens into the chamber 50 of the recess 31. The port 86 communicates with a passage 91 in the plate 60 which, in turn, communicates with a passage 92 in the body 30 which connects to a discharge fitting 93. The port 87 communicates with a passage 94 in the plate 61 which, in turn, communicates with a passage 95 in the plate 60 and a passage 96 in the body 30. The passage 96 opens into the chamber 52 of the recess 32.

The chamber 51 of the recess 31 has a passage 97 leading therefrom through the body 30. The passage 97 communicates with a passage 98 in the plate 60 which extends to a passage 100 and a port 101 in the plate 61. The port 101 is in selective communication with the groove 77 in the valve member 67 and serves, upon appropriate adjustment of the valve 63, to connect the passage 100 to the passage 94. The chamber 53 in the recess 32 also has a passage 102 extending therefrom and communicating with a passage 103 in the plate 60. The passage 103 communicates with a port 104 in the plate 61. The port 104 is in selective communication with the grooves 74 or 75 in the valve member 67 which serve to connect the port 104 to port 105 of a passage 106, also arranged in the plate 61. The passage 106 is in communication with a passage 107 in the plate 60 which connects to a passage 108 in the body 30, which, in turn, is connected to a discharge fitting 109. As will be described in detail hereinafter, the various passages, ports and grooves in the body 30, plates 60 and 61 and valve member 67 all cooperate to determine different paths of flow of liquid or air through the present apparatus.

As shown primarily in FIG. 1, in order that liquid material flowing through the apparatus may be collected, a suitable receptacle 110 is removably secured to the body 30 by means of a cap 111, the discharge fittings 93 and 109 communicating with the receptacle 110 through the cap 111. The receptacle 110 may also be provided with a suitable vent 112 and may be graduated as at 113 to provide means for measurement of liquids passing through the apparatus.

With reference to FIGS. 4 through 9, inclusive, the various available flow paths through the present apparatus are illustrated. In operation, referring primarily to FIGS. 4 and 5, the valve 63 is first positioned as illustrated in FIG. 5 and the valve 16 is positioned to direct liquid from the system 11 through the conduit 25 and into the apparatus by way of the fitting 80 and passage 81. The liquid flows through the paassages 82 and 83, port 84, groove 76 to port 86, passages 91 and 92 to the discharge fitting 93 and into receptacle 110. A small quantity of liquid is permitted to flow along this path in order to flush the apparatus of any other liquids or contaminants that may have resided therein. Thereafter, the valve 63 is positioned as shown in FIG. 7 and a flow path through the apparatus in the manner indicated in FIG. 6 is accomplished. In this instance, liquid from the system 11 enters the apparatus at the fitting 80, flows through passage 81 and passages 82 and 83 to the port 84. Thereafter the liquid passes through the groove 76 to the port 87 and through the passages 94, 95 and 96 to the chamber 52. The fluid thereafter flows through the membrane 41 and screen 40 in the recess 32 and into the chamber 53, depositing any contaminants contained in the liquid on the membrane 41. From the chamber 53, liquid flows through the passages 102 and 103 to the port 104 and, by way of the groove 74, to the port 105 and through passages 106, 107 and 108 to the discharge fitting 109 and into the receptacle 110. A measured quantity of liquid is permitted to flow along this path as indicated by the graduations 113 on the receptacle 110.

Following collection of the desired quantity of the liquid to be examined by passage of this liquid through the apparatus and into the receptacle 110, the valve 16 is positioned to direct a quantity of solvent from the source 18 to the conduit 25 and into the apparatus by way of the fitting 80. As shown in FIGS. 8 and 9, the valve 63 is positioned as indicated in FIG. 9 and the solvent flows along the path indicated in FIG. 8. Specifically, the solvent flows through passages 81, 82 and 83 to the port 84. From the port 84 the solvent flows to the port 85 by way of the groove 76 in the valve member 67. From the port 85 the solvent flows through the passages 88 and 90 to the chamber 50 of the recess 31, through the membrane 41 and screen 40 of the recess 31 and into the chamber 51. Any contaminants which may be contained in the solvent are thus removed from the solvent and deposited on the membrane 41 in the recess 31, with clean solvent passing through the passages 97, 98 and 100 to the port 101. From the port 101 the solvent is directed into the port 87, by way of the groove 77 in the valve member 67, and into passages 94, 95 and 96 to the chamber 52 in the recess 32. The solvent then passes through the membrane 41 and screen 40 in the recess 32 removing substantially all residue, of the liquid being examined, from the membrane 41, thus to leave any contaminants removed from the liquid clearly visible on the membrane 41. The solvent and the liquid residue then enter the chamber 53 and, by way of passages 102 and 103, are delivered to port 104, which is now in communication with port 105 by way of groove 75 in the valve member 67. From port 105 the solvent and liquid residue pass through passages 106, 107 and 108 to the fitting 109 and into the receptacle 110.

Thus, it may be seen that the contaminants remaining on the membrane 41 in the recess 32 may be viewed directly, or through suitable optics, through the transparent cover plate 45 that is appropriately juxtapositioned over the recess 32. An extremely reliable indication of the quantity and character of contaminants contained in the liquid under examination is thus provided.

In order to prepare the apparatus for further examination of other samples of liquid, in the event no contaminants were found in a previously tested sample, no changing of the membranes 41 will be necessary. In such an instance the valve 16 is positioned whereby to direct compressed air from the compressor 22 to the conduit 25, the compressed air following the path previously followed by the solvent and indicated in FIG. 8. The compressed air serves to dry the passages, ports and chambers of the apparatus as well as to dry the membranes 41. It is to be noted that the valve 63 may have a fourth position whereby no connection is made between the port 84 and any of the other ports in the plate 61. This position will serve to prevent flow of all liquids or air through the apparatus and, during periods of storage or transportation, to prevent entry of contaminants into the apparatus. If desired, the screws 46 may be removed to provide access to the recesses 31 and 32, whereby to permit replacement of the membranes 41 when necessary.

As an example of a particular type of liquid and solvent which may be inspected by and employed with the present apparatus, many hydraulic systems in aircraft employ a hydraulic fluid known commonly by its military specification number 5606. A suitable solvent which may be used for removing residue of this fluid from the membrane 41 associated with the recess 32 may be trichloroethylene. A suitable quantity of fluid, taken in a given sample for examination, would be 100 cubic centimeters. While this particular example is given, it is apparent that any other types of liquids may be examined and those skilled in the art may determine appropriate solvents for all such liquids.

With reference to the form of the invention shown in FIG. 10, like ports are indicated by single primed referenced numerals. In this form of the invention, a different type of valve is utilized and indicated generally at 120. The valve 120 is a slidable block 121 carried by a U-shaped guide member 122 that is adapted for attachment to the body 30' of the apparatus. An operating member 123 may be connected to the block 121 to position this block as indicated. The block 121 includes a plurality of grooves which selectively couple the various ports and passages 81′, 90′, 97′, 96′, 102′, 92′ and 108′ to establish paths of flow similar to those indicated in FIGS. 4, 6 and 8. While these connections in the block 121 need not be described in detail, suitable grooves therefore are indicated generally at 124. Other than the arrangement for switching from one flow path to another, operation of the valve 120 is similar to operation of the valve 63.

It may thus be seen that the apparatus and system of the present invention provides a rapid, efficient, reliable and relatively simple means by which liquid may be inspected for contaminant content. The device is also extremely portable and may be used at the site of the system in which such liquid is contained. Through use of the present apparatus, reliability of components of liquid systems may be enhanced, through knowledge of contaminants in the liquid indicating a necessity for cleansing or replacement thereof.

Having thus described the invention and the present embodiments thereof, it is desired to emphasize the fact that many further modifications may be resorted to in a manner limited only by a just interpretation of the following claims.

I claim:

1. In a system for determining the presence of contaminants in a liquid:
   a filter which is pervious to said liquid and impervious to said contaminants;
   means for supporting said liquid filter;
   means for conducting a quantity of said liquid through said liquid filter, said contaminants being retained by said liquid filter; and
   means for thereafter conducting a solvent through said liquid filter to remove substantially all residue of said liquid from said liquid filter whereby said contaminants will be exposed for inspection, said solvent conducting means including means for filtering said solvent prior to passage thereof through said liquid filter.

2. A system according to claim 1 wherein said solvent filtering means comprises a second filter carried by said supporting means.

3. A system for determining the presence of contaminants in a fluid system comprising:
   a filter membrane;
   housing means for receiving and supporting said membrane, a pair of chambers being defined in said housing means wherein said membrane defines common wall between said chambers;
   means for connecting one of said chambers to said fluid system;
   a receptacle;
   means for connecting the other of said chambers to said receptacle, said fluid being thus conducted along a path from said fluid system, to said one of said chambers, through said membrane, to said other of said chambers and to said receptacle to deposit said contaminants on said membrane; and
   means for thereafter terminating flow of said fluid and for directing a flow of a solvent along said path to remove substantially all residue of said fluid from said membrane to expose said contaminants for inspection.

4. A system according to claim 3 wherein said housing includes a transparent portion overlying said membrane to permit visual inspection of said contaminants residing on said membrane.

5. A system for determining the presence of contaminants in a fluid system comprising:
   a first filter membrane;
   housing means for receiving and supporting said first membrane, chambers being defined in said housing, said first membrane defining a common wall between said chambers;
   means for connecting one of said chambers to said fluid system;
   a receptacle;
   means for connecting the other of said chambers to said receptacle, said fluid being thus conducted along a first path from said fluid system to one of said chambers, through said first membrane to said other of said chambers and to said receptacle to deposit said contaminants on said membrane;
   a second filter membrane and associated chambers disposed in said housing; and
   means for terminating flow of said fluid after conduction of said fluid along said first path and for thereafter directing a flow of solvent along a second path including passage through said second membrane prior to passage through said first membrane to expose said contaminants for inspection.

6. An apparatus for testing liquids comprising:
   a container including a pair of chambers;
   a cleansing filter in one of said chambers;
   a sampling filter in the other chamber;
   a source inlet port in a first face of said container and extending therethrough to a second face, said port being adapted to be connected to a source of liquid;
   a control means co-acting with the second face and adapted to receive liquid from said inlet port and to direct the flow of liquid through said chambers in a predetermined sequence; and
   passage means co-acting with said control means of exhaust liquid from said chambers.

7. The apparatus of claim 6 including:
   viewing means in juxtaposition to said chambers to permit visual inspection of said filters.

8. The method of testing liquid in a system through a testing device having a cleansing filter, a sampling filter, an inlet port, first and second outlet ports and a valve comprising the steps of:
   connecting said inlet port to a source of said liquid;
   placing said valve in a position to permit the liquid from said system to flow through the inlet and be exhausted through the first outlet port;
   placing said valve in a position to permit said liquid from said system to flow through said sampling filter and be exhausted through the second outlet port;
   connecting said inlet to a source of solvent;
   placing the valve in a position to permit the solvent to first pass through the cleansing filter and then through the sampling filter and be exhausted through the second outlet port;
   connecting said inlet to a source of air to enable the filters and chambers to be dried by air; and inspecting said sampling filter for contaminants.

References Cited by the Examiner

UNITED STATES PATENTS

| 2,187,514 | 1/1940 | Gardner | 73—61 |
| 2,333,609 | 11/1943 | Widmann | 210—340 X |
| 2,536,406 | 1/1951 | Wilborn | 73—61 |

FOREIGN PATENTS

| 850,896 | 10/1960 | Great Britain |

DAVID SCHONBERG, *Primary Examiner.*

RICHARD C. QUEISSER, *Examiner.*

LOUIS R. PRINCE, *Assistant Examiner.*